United States Patent Office 2,890,206
Patented June 9, 1959

2,890,206

MALEIMIDE POLYMERS

Eugene A. Kraiman, Irvington, N.J., assignor to Union Carbide Corporation, a corporation of New York No Drawing. Application November 28, 1956
Serial No. 624,749

9 Claims. (Cl. 260—63)

This invention relates to novel polymers of an N,N'-bis-maleimide and a cyclopentadieneone. More particularly, this invention concerns tough, high-softening thermoplastic copolymeric products made by the reaction of an N,N'-bis-maleimide represented by the general formula

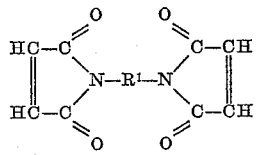

wherein $R^1$ represents a divalent hydrocarbon group such as an alkylene, arylene, aralkylene, or alkarylene group with a cyclopentadieneone represented by the general formula

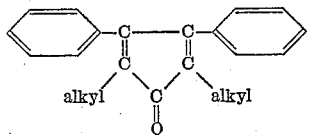

The reaction is accomplished by heating a mixture of the two monomers in an inert halogenated hydrocarbon solvent to an elevated temperature sufficient to initiate evolution of carbon monoxide, and maintaining the reaction mixture at the elevated temperature until the polymerization is substantially complete. The reaction is best conducted at a temperature of at least about 150° C., and preferably between about 200° C. to about 260° C. At temperatures below about 150° C., reaction rate is so slow that polymerization at such lower temperatures is not practical. The mixture of these monomers polymerizes at a reasonable rate in the solvent upon heating to above about 150° C. A noticeable evolution of carbon monoxide accompanies the reaction. This has led me to believe that the two monomers first condense into a Diels-Alder adduct from which carbon monoxide splits off, and the resultant compound then polymerizes with itself to produce the final polymeric product. The reaction appears to go according to the following simplified scheme:

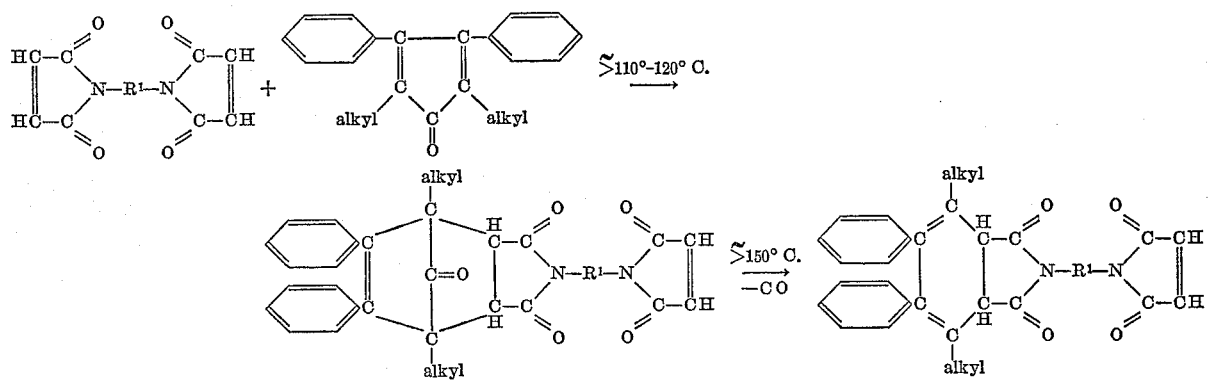

which then polymerizes into a polymer believed to have the structure:

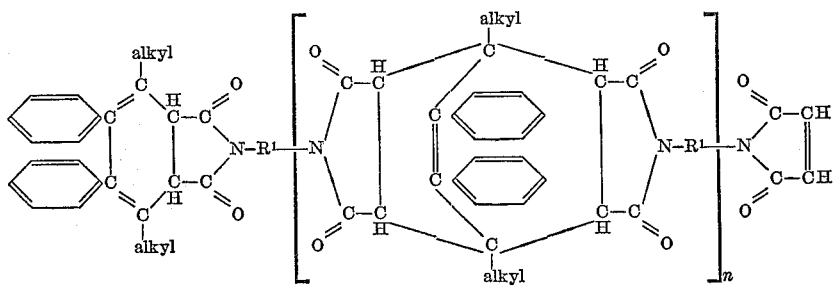

wherein $n$ represents an integer such that the products will have a sufficiently high molecular weight as to give the products a reduced viscosity of from about 0.1 to 2.0 measured at 25° C. as a 0.4 gram sample in 100 ml. of dimethylformamide. Since the products are more conveniently characterized by reduced viscosity methods, they are preferred for indicating the degree of polymerization of the product.

It is to be noted that this reaction scheme is shown for equimolar amounts of the monomers. While it is not necessary in the practice of this invention to employ equimolar amounts of the monomer, these amounts, I have found, will produce the highest molecular weight product. Products made employing a greater molal percent of one monomer will have a correspondingly reduced average molecular weight with the terminal groups of the polymer being of the monomer employed in the greatest amount. Use of extremely low amounts of one reactant compared to the other will, as expected, produce only low molecular weight resins in very low yields, and is not to be desired. The products of this invention which have been found to be useful resins are those having reduced viscosities from 0.1 to about 2.0 determined as hereinbefore set forth. The most desirable thermoplastic polymers have reduced viscosities, in excess of about 0.3. In order to achieve such viscosities, the bis-maleimide and cyclopentadieneone preferably are employed in about equimolar amounts.

The N,N'-bis-maleimides useful in this invention are conveniently prepared from maleic anhydride and a diamine in a manner such as described in U.S. Patent 2,444,536. This process basically consists of reacting maleic anhydride with an appropriate diamine to yield a bis-maleamic acid according to the following scheme:

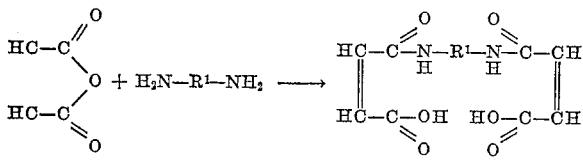

where $R^1$ is a divalent hydrocarbon group, such as an alkylene, arylene, aralkylene, or alkarylene group and substituted derivatives thereof. The maleamic acid formed is then reacted with acetic anhydride and anhydrous sodium acetate to yield the desired N,N'-bis-maleimide, according to the following scheme:

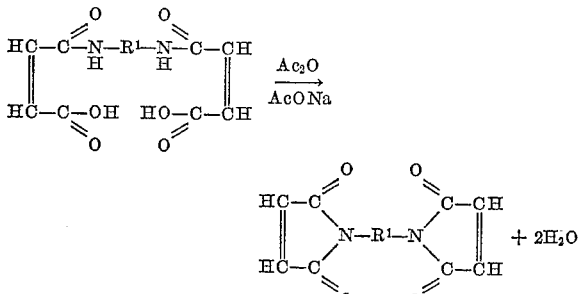

Bis-maleimides prepared in any other manner are likewise useful in this process.

The diamine employed in this preparation of the bis-maleimide determines the divalent radical connecting the maleimide groups, designated as $R^1$. Since the $R^1$ group does not enter into the reaction, it can be an aliphatic or aromatic hydrocarbon group, such as alkylene, arylene, alkarylene, and aralkylene groups and substituted derivatives thereof, preferably containing from 1 to about 20 carbon atoms. For instance, $R^1$ can be a methylene, ethylene, propylene, butylene, hexamethylene, decamethylene, phenylene, biphenylene, tolylene, ditolylene, a xylylene group, a diphenyl methane group, or alkyl substituted diphenyl methane groups such as tetramethyl diphenyl methane, diphenyl propane, diethyl diphenyl methane, or naphthalene groups and alkyl derivatives thereof, and like compounds.

The cyclopentadieneones employed in this invention are readily prepared in a manner such as described by Allen and Van Allen in J.A.C.S. 72, p. 5166 (1950), by reacting benzil

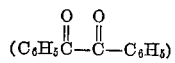

with the appropriate ketone according to the following scheme, so as to have two phenyl groups in the 3 and 4 positions and alkyl groups in the 2 and 5 positions.

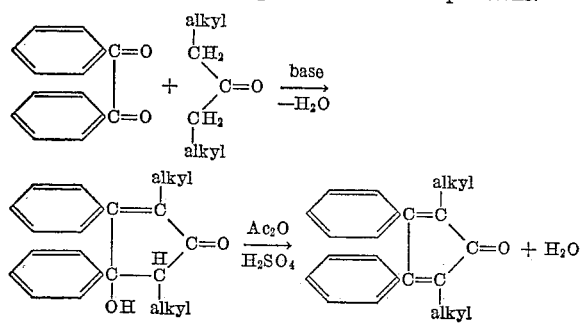

While the alkyl group in the 2 and 5 positions can be any alkyl group, particularly those from 1 to about 20 carbon atoms, I prefer the compounds having the lower alkyl groups in such positions.

It is known that some of these cyclopentadieneones will dimerize. I have found that the dimer is as useful as the monomer in this reaction, providing it is a reversible dimer, that is, one from which the monomer is formed in situ in the reaction mixture. For instance, the dimer of 2,5-dimethyl-3,4-diphenylcyclopentadieneone when employed as a reactant behaves in this reaction as if it were dissociated into the monomeric form because of the in situ formation of the monomer from the reversible dimer.

In this process I have found it necessary to provide sufficient liquid reaction media for carrying out the reaction. This is accomplished most conveniently by use of a solvent inert to the monomers and product and in which the monomers and polymer products are soluble. Halogenated aromatic compounds, particularly the chlorinated and brominated aromatic compounds having boiling points of above 150° C. have been found to be very efficient for this purpose and are preferred. Solvents such as bromobenzene, chloronaphthalene, chlorotoluene, bromotoluene, and the like are particularly desirable solvents. By dissolving the monomers in the solvent and heating to the refluxing temperature of the mixture, the reaction temperature can be easily controlled until the reaction is substantially complete or the desired product molecular weight is obtained. These polymeric products are stable at refluxing temperatures for 72 hours or more, although reaction time of 30 to 60 minutes is generally all that is necessary if the monomer concentration in the solvent is kept high. Although if desired, extended reaction times can be employed.

If desired, solvents having a boiling point below 150° C. for instance, chlorobenzene, can be employed with the pressure in the system increased above atmospheric so that the reaction mixture can be heated to at least 150° C. If desired, subatmospheric pressures can likewise be employed to lower the refluxing temperature of the reaction mixture. Alternatively, the reaction temperature can be controlled by other external or internal means of temperature regulation.

While it has been found necessary to provide a fluid reaction medium, it is preferred that the solvent be employed in amounts as low as possible. Generally, the greater the monomer concentration in the solvent, the higher the reduced viscosity obtainable, and thus the molecular weight, of the resulting polymer. However, if insufficient solvent is employed, the reaction mixture is difficult, if not impossible, to stir and to maintain a uniform reaction temperature. Incomplete reaction or side reactions may then occur which result in a lower yield and lower molecular weight of the polymer. In this manner, solvent content of the reaction mixture has a direct influence on the molecular weight of the polymer produced. In most applications, it is desired that the monomer content in the solvent be kept as high as possible, preferably in the range of about 15 to 35 parts by weight of monomers to 100 parts by weight of solvent.

Recovery of the polymer produced in this reaction is readily accomplished by precipitation in excess methanol, followed by washing, filtering, and drying. Nearly quantitative yields of polymer are secured, i.e. about 95–100 percent. Precipitation methods for recovering the product are preferred although other methods for recovery can be used, for instance, stripping off the solvent under reduced pressures is possible.

The products of this invention are hard, tough, thermoplastic polymers. These polymers have high softening points, generally at least 185° C. and more commonly above 300° C. The products produced from aromatic bis-maleimides generally have higher softening temperatures than do those from aliphatic bis-maleimides, and can range from 300° C. to 500° C. The products of this invention are soluble in most halogenated aromatic solvents, such as chlorobenzene, bromobenzene, chlorotoluene, bromotoluene, chloronaphthalene, and bromonaphthalene and in dimethylformamide. The lower softening polymers can be compression molded at temperatures of about 250° C. or cast into sheets or films from solution. The higher softening polymers can be cast from solution. The polymers are non-crystalline and non-orientable, generally having second order transitional temperatures about their softening temperatures.

Other properties of these polymeric products are particularly interesting and suggest many specific applications. Along with the high softening points, the polymers have high strengths and good electrical properties. While the polymers are not too suitable to molding at low temperatures, films can be prepared from the polymer by dissolving the polymer in a solvent and casting the solution onto a glass plate or other suitable hard flat surface. Thin films (1 to about 5 mils) of the polymers have particularly high tensile strengths for non-crystalline materials, which can range as high as 15,000 to 16,000 p.s.i. with a softening temperature often above 300° C. The polymers are likewise unaffected by dilute aqueous acids and bases and have a low degradation rate at temperatures below 200° C. For instance, heat treatment of films cast from dimethylformamide solution of a polymer prepared from 2,5-dimethyl-3,4-diphenyl cyclopentadieneone and N,N'-4,4'-(3,3'-dimethylbiphenyl) bis-maleimide (in equimolar amounts to produce a resin having a reduced viscosity of 1.6) shows good thermal stability with practically no degradation when kept at 150° C. for 48 hours, and only a small amount of degradation when kept at 200° C. for 48 hours. Degradation was more rapid at 250° C. and some color was picked up. A sample of film kept about 6 hours at 250° C. was found to be insoluble in dimethylformamide. Color formation and gelling, however, have been found to be caused by oxidation, for when heated in an inert atmosphere, such as argon, for 48 hours at 250° C., degradation occurred but there was no color or gel formation. The degradation at 250° C. in the absence of air is presumed to be the same as that which occurs when the polymerization in the refluxing high boiling solvents is allowed to run too long. This presumably is due to a reversal of the Diels-Alder reaction and subsequent reactions which change or destroy the end groups and prevent recombination. These sides reactions probably take place when the polymerization is run at too low a monomer concentration in the solvent, and prevent the formation of high molecular weight polymers.

Chemical stability tests on 4 mil films of the same polymer employed for the thermal stability tests showed them to be unaffected by 10 percent hydrochloric acid or 10 percent sodium hydroxide over a 24 hour period at room temperature. After this storage, there was no apparent visual change and no change in reduced viscosity of the resin. Other resins prepared within the limits of the invention herebefore set forth have equivalent thermal and chemical stability.

Particularly surprising is the reduction of dielectric constant and power factors with an increasing temperature as can be seen from the examples. This phenomena, while not completely explainable, suggests many possible uses within the electrical trade, such as for high temperature tubes, insulating tapes, class B motors and equipment and the like. The polymers are readily soluble in halogenated aromatic solvents and can be solubilized in such a solvent to prepare a varnish, coating composition, or casting solution from which films, fibers, coatings, etc. can be prepared.

The following examples are illustrative.

EXAMPLE 1

A mixture of 65.0 grams (0.125 mole) of 2,5-dimethyl-3,4-diphenylcyclopentadieneone dimer and 69.00 grams (0.250 mole) of hexamethylene-bis-maleimide was heated with stirring in a flask with 250 ml. of α-chloronaphthalene to refluxing (~260° C.), and maintained under refluxing conditions for 20 minutes. After this period, the mixture was drained into excess methanol in a Waring blendor. The polymeric material produced in the reaction precipitated, was filtered from the methanol solution, washed several times with fresh methanol, and dried in an oven for 12 hours at 100° C. The dried weight of product was 125 grams, which indicated a yield of 98 percent of theoretical.

The dried polymeric material was an almost colorless fluffy powder, softening at about 190° C. The product had a reduced viscosity of 0.73 at 25° C. as determined by dissolving ~0.4 gram of the product in 100 ml. of dimethylformamide with viscosity measurements made on a Cannon-Fenske viscometer. The product was soluble in chloroform, dimethylformamide, and other chlorinated hydrocarbons. Films were cast from solvent to yield a tough, transparent, flexible film. The polymer did not give an X-ray pattern and could not be oriented. The second order transitional temperature is about the same as the heat distortion temperature.

The polymeric product was compression molded at about 250° C. and ~1000 p.s.i. into a rectangular rod and disc having the following physical properties:

| | |
|---|---|
| Tensile strength | 6000 p.s.i. |
| Tensile modulus | $0.16 \times 10^6$ p.s.i. |
| Percent elongation | 6%. |
| Flexural strength | 16,100 p.s.i. |
| Modulus of elasticity | $0.396 \times 10^6$ p.s.i. |
| ASTM heat distortion | 186.5° C. |
| Water absorption | 0.51%. |
| Arc resistance | 79 sec. |
| Dielectric strength: | |
| Short time | 366 volts/mil. |
| Step by step | 429 volts/mil. |

| | Room Temp. | 50° C. | 100° C. |
|---|---|---|---|
| Dielectric Constant: | | | |
| 60 cps | 2.83 | 2.83 | 2.64 |
| $10^3$ cps | 2.86 | 2.83 | 2.64 |
| $10^6$ cps | 2.69 | 2.76 | 2.66 |
| $30 \times 10^6$ cps | 4.28 | 4.25 | 4.17 |
| Power Factor: | | | |
| 60 cps | 0.00130 | 0.00142 | 0.00201 |
| $10^3$ cps | 0.00207 | 0.00173 | 0.00200 |
| $10^6$ cps | 0.00965 | 0.00664 | 0.0153 |
| $30 \times 10^6$ cps | 0.0265 | 0.0212 | 0.0178 |
| Loss Factor: | | | |
| 60 cps | 0.00368 | 0.00402 | 0.00531 |
| $10^3$ cps | 0.00592 | 0.00490 | 0.00528 |
| $10^6$ cps | 0.0260 | 0.0183 | 0.0407 |
| $30 \times 10^6$ cps | 0.113 | 0.0901 | 0.0742 |

EXAMPLE 2

A mixture of 1.44 grams (0.025 mole) of 2-methyl-5-propyl-3,4-diphenylcyclopentadieneone dimer and 1.38 grams (0.05 mole) of hexamethylene-bis-maleimide was heated in a flask with 25 ml. of bromobenzene to refluxing (~155° C.) and maintained under refluxing conditions for 72 hours. After this period, the mixture was added to excess methanol. The polymeric material produced in the reaction precipitated, was filtered from the methanol solution and dried in an oven. The dried weight of product was 2.6 grams, which indicated a yield of 96 percent of theoretical.

The dried polymeric material was an almost colorless powder, softening about 250° C. The product had a reduced viscosity of 0.45 at 25° C. as determined by dissolving ~0.4 gram of the product in 100 ml. of dimethylformamide with viscosity measurements made on a Cannon-Fenske viscometer. The product was soluble in dimethyl-formamide and chlorinated hydrocarbons, from which films could be cast.

EXAMPLE 3

A mixture of 1.30 grams (0.025 mole) of 2,5-dimethyl-3,4-diphenylcyclopentadieneone dimer and 2.07 grams (0.05 mole) of 3,5 3',5'-tetramethyl-4,4'-diphenyl-methane-bis-maleimide was heated in a flask with 25 ml. of bromobenzene to refluxing (~155° C.), and maintained under refluxing conditions for 72 hours. After this period, the mixture was added to excess methanol in a Waring Blendor. The polymeric material produced in the reaction precipitated, was filtered from the methanol solution, and dried in an oven. The dried weight of product was 3.1 grams, which indicated a yield of 97 percent of theoretical.

The dried polymeric material was an almost colorless powder, softening at greater than 300° C. The product had a reduced viscosity of 0.23 at 25° C. as determined by dissolving ~0.4 gram of the product in 100 ml. of dimethylformamide with viscosity measurements made on a Cannon-Fenske viscometer. The product was soluble in dimethylformamide.

EXAMPLE 4

A mixture of 26.00 grams (0.05 mole) of the dimer of 2,5-dimethyl-3,4-diphenylcyclopentadieone-1, and 27.60 grams (0.1 mole) of N,N'-hexamethylene-bis-maleimide and 100 cc. of $\alpha$-chloronaphthalene were stirred and heated up to reflux (260° C.) during a period of 30 minutes. At this time a sample was removed and at other intervals indicated below, and reduced viscosities were run in dimethylformamide at 25° C.

| Time after reflux (hr.): | R.V. |
|---|---|
| 0 | 0.87 |
| 1 | 0.97 |
| 2 | 0.97 |
| 3 | 1.08 |
| 6 | 1.20 |

The polymer precipitated in methanol after 6 hours. It could be molded at about 250° C. It is soluble in chloroform, chlorobenzene, $\alpha$-chloronaphthalene, and softened by acetone and benzene but not dissolved.

EXAMPLE 5

Polymers were prepared in the manner of Example 1 from the monomer listed in the following table. Reduced viscosity and melting point of the polymer are likewise indicated. Reduced viscosity was determined at 25° C. on a 0.4 gram sample in 100 ml. of dimethylformamide.

EXAMPLE 6

A polymer was prepared in the manner of Example 1 from equimolar amounts of N,N'-4,4'-(3,3'-dimethyl-biphenyl)-bis-maleimide and 2,5-dimethyl-3,4-diphenyl-cyclopentadieneone-1 (added as the dimer —0.5 mole per mole of maleimide). The resultant polymer had a reduced viscosity at 25° C. of 1.61 (measured as a 0.4 gram sample in 100 ml. of dimethylformamide) and the following physical properties:

| | |
|---|---|
| Tensile strength | 15,800 p.s.i. |
| Tensile modulus | 390,000 p.s.i. at room temp. |
| | 210,000 p.s.i. at 200° C. |
| Elongation | 4.5% |
| Second order transition temp. | >360°C. |
| Dielectric strength: | |
| Short time | 207 volts/mil. |
| Step by step | 197 volts/mil. |

| | Room Temp. | 50° C. | 100° C. |
|---|---|---|---|
| Dielectric Constant: | | | |
| 60 cps | 3.28 | 3.03 | 2.87 |
| 10³ cps | 3.28 | 3.02 | 2.86 |
| 10⁶ cps | 3.11 | 2.97 | 2.85 |
| 27×10⁶ cps | 3.06 | | |
| Power Factor: | | | |
| 60 cps | .00205 | .00178 | .00165 |
| 10³ cps | .00229 | .00188 | .00157 |
| 10⁶ cps | .0113 | .00869 | .00373 |
| 27×10⁶ cps | .0249 | | |

EXAMPLE 7

A polymer was prepared in the manner of Example 1 from equimolar amounts of N,N'-4,4'-biphenyl-bis-maleimide and dimer of 2,5-dimethyl-3,4-diphenylcyclo-pentadieneone-1 (added as the dimer —0.5 mole per mole of maleimide). The resultant polymer had a reduced viscosity at 25° C. of 0.55 (measured as a 0.4 gram sample in 100 ml. of dimethylformamide) and the following physical properties:

| | |
|---|---|
| Tensile strength | 11,800 p.s.i. |
| Tensile modulus | 240,000 p.s.i. at room temp. |
| | 150,000 p.s.i. at 200° C. |
| Elongation | 17% |
| Second order transition temp. | >400° C. |
| Dielectric strength: | |
| Short time | 273 volts/mil. |
| Step by step | 234 volts/mil. |

Table 1

| 3,4-diphenyl-cyclo-pentadieneone | N,N'-Bis-Maleimide | Solvent | Moles Monomer Per Liter Solvent | Percent Yield | Reduced Viscosity | M.P., °C. |
|---|---|---|---|---|---|---|
| 2,5-dimethyl | hexamethylene | bromobenzene ᵃ | 0.20 | (ᶜ) | 0.34 | 235 |
| Do | do | $\alpha$-chloronaphthalene ᵃ | 0.20 | (ᶜ) | 0.77 | 235 |
| Do | 2,4-tolylene | bromobenzene ᵃ | 0.20 | (ᶜ) | 0.12 | >300 |
| Do | 4,4'-bis-o-tolylene | bromobenzene ᵃ | 0.20 | (ᶜ) | 2.05 | >300 |
| 2-methyl-5-propyl | do | bromobenzene ᵃ | 0.20 | (ᶜ) | 0.89 | >300 |
| Do | 2,4-tolylene | bromobenzene ᵃ | 0.20 | (ᶜ) | 0.13 | >300 |
| Do | m-phenylene | bromobenzene ᵃ | 0.20 | (ᶜ) | 0.28 | >300 |
| 2,5-dimethyl | 4,4'-(3,3'-dimethylbiphenyl) | $\alpha$-chloronaphthalene ᵇ | 0.50 | 99 | 1.61 | >300 |
| Do | 4,4'-biphenyl | $\alpha$-chloronaphthalene ᵇ | 0.20 | 94 | 0.53 | 300 |
| Do | 4,4'-diphenylmethane | $\alpha$-chloronaphthalene ᵇ | 0.50 | 96 | 0.67 | >300 |
| Do | 4,4'-(2,5 2',5'-tetramethyl-diphenylmethane) | $\alpha$-chloronaphthalene ᵇ | 0.50 | 97 | 0.27 | >300 |
| Do | 4,4'-(3,5 3',5'-tetramethyl-diphenylmethane) | $\alpha$-chloronaphthalene ᵇ | 0.50 | 99 | 0.34 | >300 |
| Do | 4,4'-(3,3'-dimethyldiphenylmethane) | $\alpha$-chloronaphthalene ᵇ | 0.50 | 98 | 0.36 | >300 |

ᵃ Refluxed at atmospheric pressure for 72 hours.
ᵇ Refluxed at atmospheric pressure for 30 minutes.
ᶜ Not determined—believed to be 95% or better.

| | Room Temp. | 50° C. | 100° C. |
|---|---|---|---|
| Dielectric Constant: | | | |
| 60 cps | 3.11 | 3.09 | 2.88 |
| 10³ cps | 3.09 | 3.07 | 2.86 |
| 10⁶ cps | 2.91 | 2.95 | 2.82 |
| 30×10⁶ cps | 2.96 | | |
| Power Factor: | | | |
| 60 cps | .00439 | .00342 | .00288 |
| 10³ cps | .00561 | .00448 | .00342 |
| 10⁶ cps | .0135 | .0111 | .00633 |
| 30×10⁶ cps | .0325 | | |

EXAMPLE 8

A polymer was prepared in the manner of Example 1 from equimolar amounts of N,N'-4,4'-diphenylmethane-bismaleimide and dimer of 2,5-dimethyl-3,4-diphenylcyclopentadieneone-1 (added as the dimer —0.5 mole per mole of maleimide). The resultant polymer had a reduced viscosity at 25° C. of 0.67 (measured as a 0.4 gram sample in 100 ml. of dimethylformamide) and the following physical properties:

Tensile strength _____ 10,400 p.s.i.
Tensile modulus _____ { 240,000 p.s.i. at room temp.
110,000 p.s.i. at 200° C.
Elongation _____ 18%.
Second order transition temp. _____ >300° C.
Dielectric strength:
  Short time _____ 167 volts/mil.
  Step by step _____ 226 volts/mil.

| | Room Temp. | 50° C. | 100° C. |
|---|---|---|---|
| Dielectric Constant: | | | |
| 60 cps | 3.24 | 3.11 | 3.02 |
| $10^3$ cps | 3.28 | 3.07 | 3.01 |
| $10^6$ cps | 3.04 | 2.98 | 2.92 |
| $30 \times 10^6$ cps | 3.10 | | |
| Power Factor: | | | |
| 60 cps | .00621 | .00547 | .00268 |
| $10^3$ cps | .00591 | .00609 | .00534 |
| $10^6$ cps | .00947 | .00841 | .00558 |
| $30 \times 10^6$ cps | .0224 | | |

What is claimed is:

1. A normally solid thermoplastic resinous heat reaction product of about equimolar amounts of an N,N'-bis-maleimide having the general formula

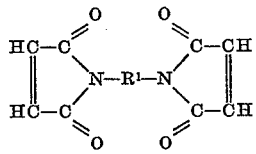

wherein $R^1$ is a divalent hydrocarbon group, and of a cyclopentadieneone having the general formula

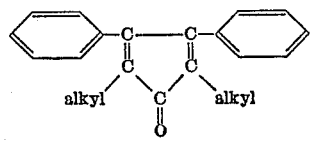

2. A normally solid thermoplastic resinous heat reaction product produced from about equimolar amounts polymerized therein of an N,N'-bis-maleimide having the general formula

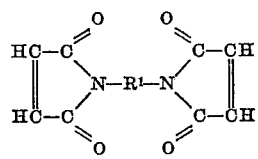

wherein $R^1$ is a divalent hydrocarbon group, and of a cyclopentadieneone having the general formula

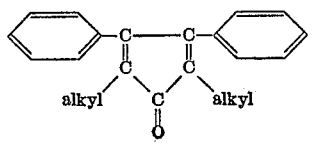

said resinous product characterized by the structure

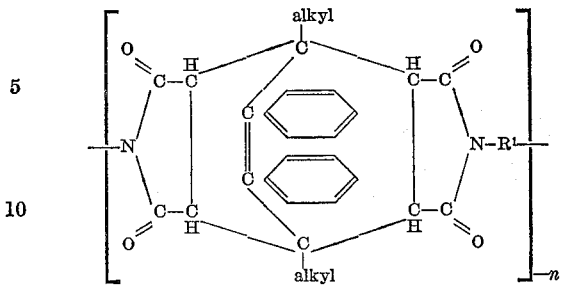

wherein $R^1$ is as characterized above and $n$ is an integer such that the products have a reduced viscosity at 25° C. of from about 0.1 to about 2.0 measured as a 0.4 gram sample of the product in 100 ml. of dimethylformamide.

3. A process for preparing a thermoplastic polymeric product which comprises heating in the presence of an inert solvent for reactants and products to provide a liquid reaction media, an N,N'-bis-maleimide having the general formula

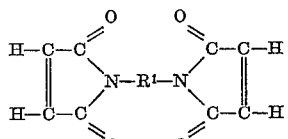

wherein $R^1$ is a divalent hydrocarbon, with a cyclopentadieneone having the general formula

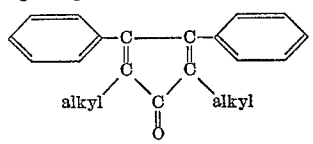

to an elevated temperature at least sufficient to initiate the evolution of carbon monoxide.

4. A process for preparing a thermoplastic polymeric product which comprises heating in the presence of an inert halogenated aromatic hydrocarbon solvent in an amount sufficient to provide a liquid reaction media, about equimolar amounts of an N,N'-bis-maleimide having the general formula

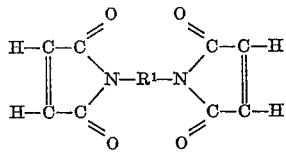

wherein $R^1$ is a divalent hydrocarbon, and a cyclopentadieneone having the general formula

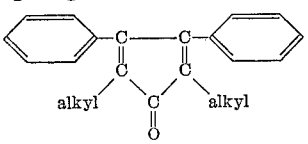

to an elevated temperature at least sufficient to initiate the evolution of carbon monoxide and polymerize the mixture.

5. A process according to claim 3 wherein the said aromatic solvent is present in amounts of about 100 parts by volume to from about 20 to about 40 parts by weight of total reactants.

6. A solid thermoplastic polymeric heat reaction product of an N,N'-bis-maleimide having the general formula

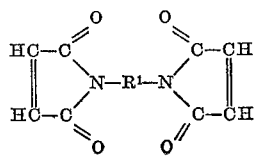

wherein $R^1$ is a divalent radical selected from the group consisting of alkylene, arylene, aralkylene, and alkarylene radicals, and about an equimolar amount of 2,5-dimethyl-3,4-diphenyl-cyclopentadieneone-1, characterized by having a reduced viscosity at 25° C. of from about 0.1 to about 2.0 measured as a 0.4 gram sample of the product in 100 ml. of dimethylformamide.

7. A solid thermoplastic polymeric reaction product of an N,N'-bis-maleimide having the general formula

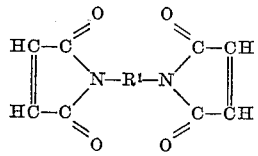

wherein $R^1$ is a divalent radical selected from the group consisting of alkylene, arylene, aralkylene, and alkarylene radicals, and about an equimolar amount of 2-methyl-5-propyl-3,4-diphenylcyclopentadieneone-1 characterized by having a reduced viscosity at 25° C. of from about 0.1 to about 2.0 measured as a 0.4 gram sample of the product in 100 ml. of dimethylformamide.

8. A process for preparing a thermoplastic polymeric product which comprises heating in the presence of an inert solvent for reactants and products to provide a liquid reaction media, an N,N'-bis-maleimide having the general formula

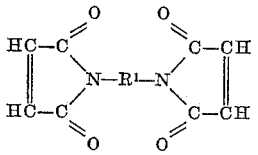

wherein $R^1$ is a divalent radical selected from the group consisting of alkylene, arylene, aralkylene, and alkarylene radicals and 2,5-dimethyl-3,4-diphenylcyclopentadieneone-1 present in about equimolar amounts to a temperature of at least 150° C. and recovering the polymer thus produced.

9. A process for preparing a thermoplastic polymeric product which comprises heating in the presence of an inert solvent for reactants and products to provide a liquid reaction media, an N,N'-bis-maleimide having the general formula

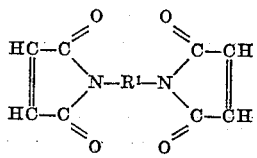

wherein $R^1$ is a divalent radical selected from the group consisting of alkylene, arylene, aralkylene, and alkarylene radicals and 2-methyl-5-propyl-3,4-diphenylcyclopentadieneone-1 present in about equimolar amounts to a temperature of at least 150° C. and recovering the polymer thus produced.

No references cited.